United States Patent Office 3,535,383
Patented Oct. 20, 1970

---

3,535,383
PROCESS FOR PREPARATION OF HEXADECYLKETENE
Edward S. Rothman, Philadelphia, Pa., assignor to the United States of America as represented by the Secretary of Agriculture
No Drawing. Continuation-in-part of application Ser. No. 549,783, May 13, 1966. This application Nov. 2, 1967, Ser. No. 680,053
Int. Cl. C07c 49/22, 69/24; C07d 7/16
U.S. Cl. 260—585.5                     4 Claims

ABSTRACT OF THE DISCLOSURE

The isopropenyl ester of a long carbon chain saturated, monocarboxylic, aliphatic fatty acid is heated in the presence of a high boiling aprotonic diluent and an acid catalyst to produce a reaction mixture containing an alkylketene. The reaction mixture is allowed to stand until the alkylketene tetramerizes to 3,5-dihexadecyl-6-heptadecyl-2-stearoyloxy gamma pyrone.

---

This application is a continuation-in-part of application bearing Ser. No. 549,783, filed May 13, 1966, now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to preparation of long carbon chain alkylketenes and tetramers thereof. More particularly this invention relates to a novel process for preparing hexadecylketene and 3,5-dihexadecyl-6-heptadecyl-2-steroyloxy gamma pyrone. The latter compound may be termed hexadecylketene tetramer.

Although ketenes are a recognized class of compounds, the most commonly known member is ketene itself, $CH_2=C=O$, prepared by pyrolysis of acetone or acetic acid by passing the latter compounds as a vapor through a tube at 500–600° C. The classical preparation of a long carbon chain, such as $C_{12}$–$C_{20}$, ketene has been by dehydrohalogenation of the respective acid chloride, or dehalogenation of α-halo acyl halides by zinc metal.

According to the present invention the isopropenyl ester of a long carbon chain saturated, monocarboxylic aliphatic fatty acid, a high boiling aprotonic (inert) diluent, and at least a catalytic amount of an acid catalyst are combined to provide a reaction mixture, and the mixture is heated to a temperature sufficient to initiate a reaction, thus producing a reaction mixture containing an alkylketene having the same number of carbon atoms as the starting fatty acid. The reaction mixture is allowed to cool. If the ketene is to be used for acylation, the substrate, e.g. an alcohol, is added to the crude reaction mixture. Under careful anhydrous conditions, long carbon chain alkylketenes, somewhat more stable than ketene, can be isolated and used for acylation or other organic reactions. If the reaction mixture is allowed to stand, the ketene tetramerizes to a stable crystalline solid that is readily separated and purified by conventional procedures.

It should be noted that a saturated ester, such as isopropyl stearate, is not the equivalent of the enol ester, such as isopropenyl stearate, and only that latter type of compound is operable in the process of the present invention.

The ketenes are active compounds and are useful as acylating agents, as demonstrated in Example 1, where a tertiary alcohol, an example of a compound which is not readily acylated, reacted with the ketene to produce an ester, or as illustrated in Examples 2 and 3 self-condensed to produce a tetramer.

The lactonic dimers of fatty acid ketenes have been used in various industries, such as petroleum, food, textile and paper. In the paper industry the fatty acid dimer serves to bind fillers to the cellulosic fibers and confers increased wet-strength and other properties to the paper products. Other dimers and the tetramer of hexadecyl ketene described here are also useful as acylation agents, e.g. converting n-butyl amine to N-n-butyl stearamide.

The presence of the high boiling aprotonic diluent, such as white paraffin oils (liquid petrolatum) or paraffin wax, is critical to the production of ketene from the isopropenyl ester. When the reaction mixture is heated to at least about 180° C., the ketene is obtained in high yields in less than half an hour. While somewhat higher or lower temperatures may be applicable, a temperature of about 200°±20° C. is preferred.

The acid catalyst is typically of the sulfonic acid type; an aryl sulfonic acid such as p-toluenesulfonic acid, or an alkyl sulfonic acid such as methane or ethane sulfonic acid being preferred. The catalyst need be present in only trace amounts, a fraction of a percent of the catalyst based on total weight of the mixture sufficing to produce high yields of desired products.

While the aprotonic diluent is critical to the process of the present invention, the ratio of diluent to the isopropenyl ester can be varied considerably within the scope of the invention. In a preferred embodiment of the invention about equal parts by weight are combined.

The isopropenyl esters are conveniently prepared by the sulfuric acid catalyzed interchange reaction of alkanoic acids with commercially available isopropenyl acetate as described in J. Org. Chem., 27, 3123 (1962). While the invention is exemplified with isopropenyl stearate, the isopropenyl esters of saturated monocarboxylic fatty acids containing 12 to 20 carbon atoms are considered operable in the process of the present invention to prepare their respective ketenes and tetramers.

The commercial paraffin products employed as the aprotonic diluent are, by the nature of their separation from petroleum, of a high degree of purity.

The following examples are presented in illustration of the processes of the present invention, but are not intended to be in limitation thereof.

EXAMPLE 1

Isopropenyl stearate, 8.06 g., light paraffin oil (liquid petrolatum), 10 ml., and 0.1 g. p-toluenesulfonic acid were combined in a flask equipped with reflux condenser (drying tube on condenser) and thermometer, and heated to 200° C. for 20 minutes. The reaction mixture was allowed to cool to room temperature. An infrared spectrum of a sample showed the absence of stearic anhydride in the reaction mixture. Upon the addition of a trace of water to the sample, however, stearic anhydride was obtained.

Substantially anhydrous t-butanol was added to the crude ketene product in the flask. Reaction occurred at room temperature to give the ester, t-butyl stearate, which was separated and identified.

EXAMPLE 2

The procedure of Example 1 was repeated through allowing the reaction mixture to cool to room temperature. After standing two days, a tetrameric product was separated and crystallized from hexane. The tetrameric product, a gamma pyrone had the following characteristics: M.P. 75.5–76.3° C.;

$$\lambda_{max.}^{isooctane} = 298\ m\mu$$

and $\nu_{max.}$ 1760, 1714, 1642, 1573 cm.$^{-1}$ (frozen melt between NaCl plates).

EXAMPLE 3

The process of Example 2 was repeated with the exception that 8 g. paraffin wax, M.P. 56–68° C., was used as the aprotonic diluent in place of the light paraffin oil. Upon standing, the ketene tetramerized as in Example 2 to give hexadecylketene tetramer. The ultraviolet absorption maximum at 298 mμ is considered to be due to the conjugated carbonyl system augmented by the participation in the resonant system of hydroxyl oxygen electrons as represented in the formula

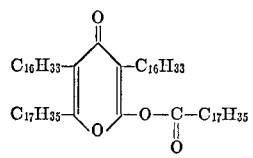

The infrared spectrum and observed molecular weight confirm this formula for the tetramer.

I claim:

1. A process for the preparation of hexadecylketene comprising combining isopropenyl stearate, a high boiling aprotonic diluent selected from the group consisting of liquid petrolatum and paraffin wax and at least a catalytic amount of a sulfonic acid selected from the group consisting of p-toluenesulfonic acid, methane sulfonic acid, and ethane sulfonic acid, to provide a reaction mixture, and heating said mixture to about 200° C., to produce hexadecylketene.

2. The process of claim 1 in which the acid catalyst is p-toluenesulfonic acid.

3. The process of claim 2 in which the aprotonic diluent is liquid petrolatum.

4. The process of claim 2 in which the aprotonic diluent is paraffin wax.

No references cited.

NORMA S. MILESTONE, Primary Examiner

U.S. Cl. X.R.

260—345.8, 410.9